United States Patent [19]
George et al.

[11] Patent Number: 5,687,981
[45] Date of Patent: Nov. 18, 1997

[54] HEIGHT ADJUSTMENT SYSTEM FOR TRUCKS

[76] Inventors: James L. George; Fred D. Couch, both of P.O. Box 248, Black Oak, Ark. 72414

[21] Appl. No.: 444,364

[22] Filed: May 18, 1995

[51] Int. Cl.⁶ ..................................................... B60P 1/04
[52] U.S. Cl. ...................... 280/405.1; 298/20 R; 414/469
[58] Field of Search ........................... 280/423.1, 405.1, 280/407.1, 475, 763.1, 765.1, 766.1, 767, DIG. 1; 180/209; 414/469, 401; 298/20 R

[56] References Cited

U.S. PATENT DOCUMENTS

| | | | |
|---|---|---|---|
| 3,973,754 | 8/1976 | Chadwick | 280/766.1 |
| 4,056,203 | 11/1977 | Meldhal et al. | 414/540 |
| 4,186,901 | 2/1980 | Shorey | 244/137.1 |
| 4,498,836 | 2/1985 | Love | 414/537 |
| 4,741,662 | 5/1988 | Schmiesing | 280/766.1 |
| 4,880,346 | 11/1989 | Brassette | 414/486 |
| 5,015,147 | 5/1991 | Taylor et al. | 280/765.1 |
| 5,133,634 | 7/1992 | Gingrich et al. | 414/537 |
| 5,275,526 | 1/1994 | Moseley | 414/495 |
| 5,374,154 | 12/1994 | Alten | 414/537 |
| 5,388,949 | 2/1995 | Berg | 280/765.1 |

FOREIGN PATENT DOCUMENTS

| | | |
|---|---|---|
| 2626823 | 8/1989 | France . |
| 2841756 | 4/1979 | Germany . |
| 2850347 | 12/1980 | Germany . |

*Primary Examiner*—Anne Marie Boehler
*Attorney, Agent, or Firm*—Richard C. Litman

[57] ABSTRACT

A height adjustment system for automatically adjusting the height of the tail of a tilt bed truck in response to changes in the terrain profile. The tail of the bed of the truck is adjustable in height relative to ground level by a lifting mechanism, such as a hydraulic, pneumatic, or electromechanical lift. The main components of the height adjustment system include a terrain following member and a support member. The terrain following member follows the terrain profile as the truck traverses the terrain. The support member movably attaches the terrain following member to the bed of the truck proximate the tail. The support member moves relative to the bed of the truck responsive to the terrain profile and is capable of assuming a range of positions, including a first position and a second position. The support member closes a first electrical contact when in the first position and closes a second electrical contact when in the second position. The lifting mechanism is electrically connected to the first electrical contact and the second electrical contact. Closing the first electrical contact or the second electrical contact causes the lifting mechanism to adjust the height of the tail, thereby causing the support member to assume a position intermediate the first position and the second position.

13 Claims, 4 Drawing Sheets

HEIGHT ADJUSTMENT SYSTEM FOR TRUCKS

BACKGROUND OF THE INVENTION

1. Field of the Invention

The present invention relates to a system for automatically adjusting the height of the tail of a tilt-bed truck.

2. Description of the Prior Art

During the process of harvesting cotton, freshly picked cotton is hydraulically pressed into large blocks, called cotton modules, for transportation from the cotton field to the cotton gin. A typical cotton module is thirty-four feet in length, seven feet wide, and 8 feet high. A cotton module truck is used to transport the cotton modules from the cotton field to the cotton gin. The cotton module truck includes a tilt bed that can be raised or lowered relative to the frame of the truck by a lifting mechanism, such as a hydraulic, pneumatic, or electro-mechanical lift. The bed of the truck includes a tail having a series of rotating chains designed to lift up the cotton module and carry the module into the bed of the truck. The chains extend across the width of the truck bed and travel the length of the truck bed in the form of a conveyor.

Typically, the cotton module truck is operated solely by the driver alone to pick up and transport the cotton modules. The driver, from within the cab of the truck, can manually raise and lower the tail of the truck bed relative to the ground. The driver aligns the tail with the cotton module and then lowers the tail section, by raising the front of the truck bed, to engage the module. As such, the driver frequently encounters difficulty adjusting the tail to the proper height because his or her vision is obscured by the bed of the truck. If the tail is not adjusted to the proper height, the cotton module can be torn apart, rather than lifted into the truck bed, by the rotating chains of the tail. Additionally, as the truck traverses the terrain to engage the cotton module, changes in the terrain profile require frequent adjustments of the height of the tail, otherwise the tail may inadvertently strike the ground or engage the cotton module at an improper height. For the foregoing reasons, there is need for a system that automatically adjusts the height of the tail of the truck bed such that cotton modules may be easily lifted into the bed of the truck.

Tilt bed trucks and lift mechanisms for trucks and other vehicles are known in the art. Examples of such trucks and lift mechanisms can be seen in U.S. Pat. No. 4,880,346, issued to Duane J. Brassette on Nov. 14, 1989; U.S. Pat. No. 4,056,203, issued to Robert D. Meldahl on Nov. 1, 1977; U.S. Pat. No. 4,186,901, issued to Thomas H. Shorey on Feb. 5, 1980; U.S. Pat. No. 4,498,836, issued to Richard R. Love on Feb. 12, 1985, U.S. Pat. No. 5,133,634, issued to Eli L. Gingrich et al. on Jul. 28, 1992; U.S. Pat. No. 5,275,526, issued to John F. Moseley on Jan. 4, 1994; U.S. Pat. No. 5,374,154, issued to Kurt Alten on Dec. 20, 1994; French Patent Document No. 2,626,823, filed by Jean-Paul Clerc and published on Aug. 11, 1989; German Patent Document No. 2,841,756, filed by Gordon Andrew Morris and published on Dec. 4, 1979; and German Patent Document No. 2,850,347, filed by Hans Lindner and published on Dec. 12, 1990. None of the instant patents and patent documents teach or suggest a height adjustment system for automatically adjusting the height of the tail of the tilt bed truck in response to changes in the terrain profile. Additionally, each of the instant patents and patent documents lacks a support member movably attaching a terrain following member to the bed of a tilt bed truck.

None of the above inventions and patents, taken either singly or in combination, is seen to describe the instant invention as claimed.

SUMMARY OF THE INVENTION

The present invention is directed to a height adjustment system for automatically adjusting the height of the tail of a tilt bed truck in response to changes in the terrain profile. The tail of the bed of the truck is adjustable in height relative to ground level by a lifting mechanism, such as a hydraulic, pneumatic, or electro-mechanical lift. The main components of the height adjustment system include a terrain following member and a support member.

The terrain following member follows the terrain profile as the truck traverses the terrain. The support member movably attaches the terrain following member to the bed of the truck proximate the tail. The support member moves relative to the bed of the truck responsive to the terrain profile and is capable of assuming a range of positions, including a first position and a second position. The support member closes a first electrical contact when in the first position and closes a second electrical contact when in the second position. The lifting mechanism is electrically connected to the first electrical contact and the second electrical contact. Closing the first electrical contact or the second electrical contact causes the lifting mechanism to adjust the height of the tail thereby causing the support member to assume a position intermediate the first position and the second position.

In alternative embodiments of the present height adjustment system, the terrain following member is a wheel and the first and second electrical contacts are normally open limit switches.

Accordingly, it is a principal object of the invention to provide a system that automatically adjusts the height of the tail of a tilt bed truck in response to changes in the terrain profile.

It is another object of the invention to provide a height adjustment system that automatically maintains the tail of a cotton module truck at a constant height relative to terrain level as the truck traverse the terrain.

It is a further object of the invention to provide a height adjustment system which is easily adaptable to existing cotton module trucks.

It is an object of the invention to provide improved elements and arrangements thereof in an system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
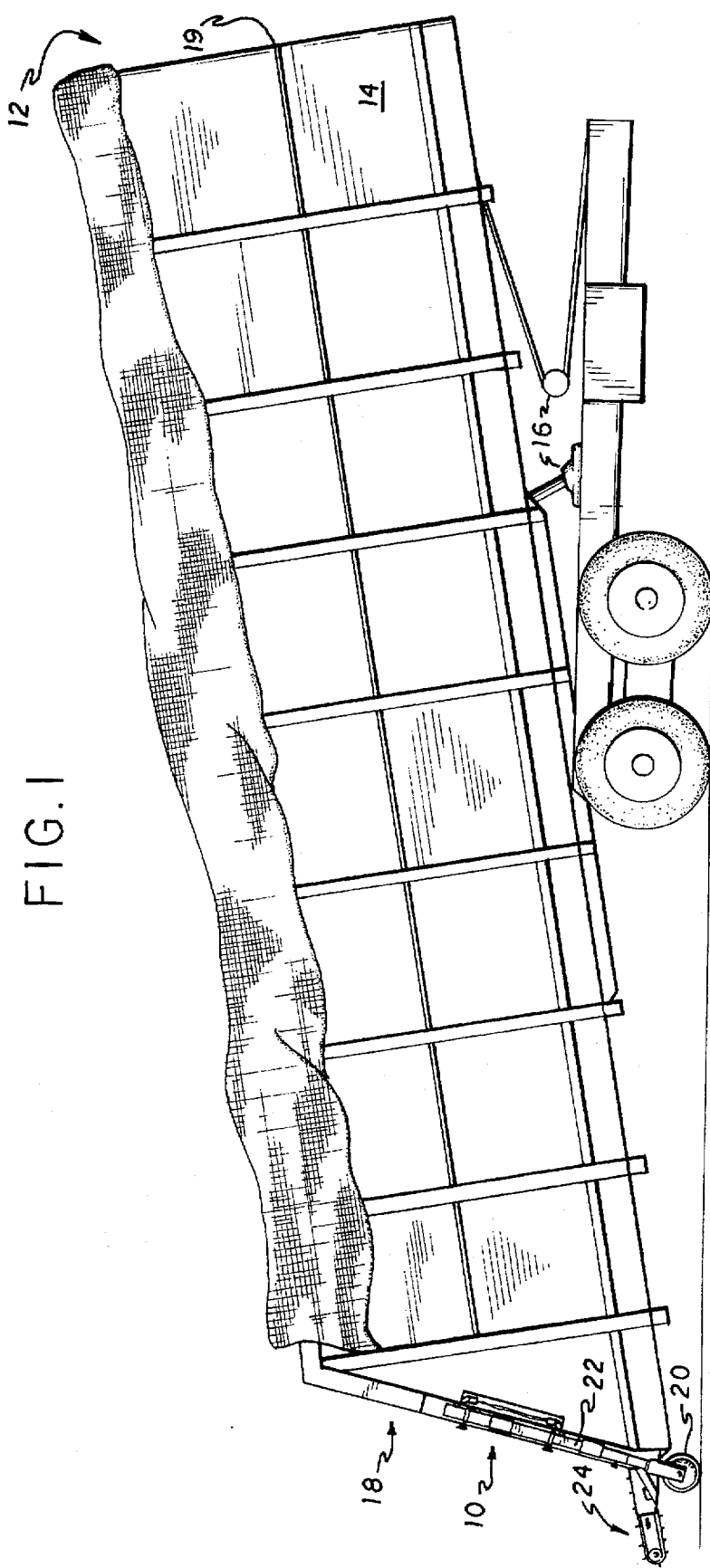
FIG. 1 is side elevational, environmental view of the present invention, showing the invention mounted on a cotton module truck and illustrating the tilt bed of the cotton module truck.

A height adjustment system 10 for automatically adjusting the height of the tail of a tilt bed truck in response to changes in the terrain profile is shown in FIG. 1. Conventional parts of a cotton module truck 12 on which the height adjustment system 10 is mounted includes a tilt bed 14, a lift mechanism 16, and a tail section 18. The cab of the truck 12 is not shown for ease of illustration. Tilt bed 14 includes a front end 19. The tail section 18 of the tilt bed 14 is adjustable in height relative to ground level by lifting mechanism 16. Lift mechanism 16 can be any well known lifting mechanism, including a hydraulic, pneumatic, or electro-mechanical lift. The main components of height adjustment system 10 include a terrain following member 20 and a support member 22.

Figure 2:
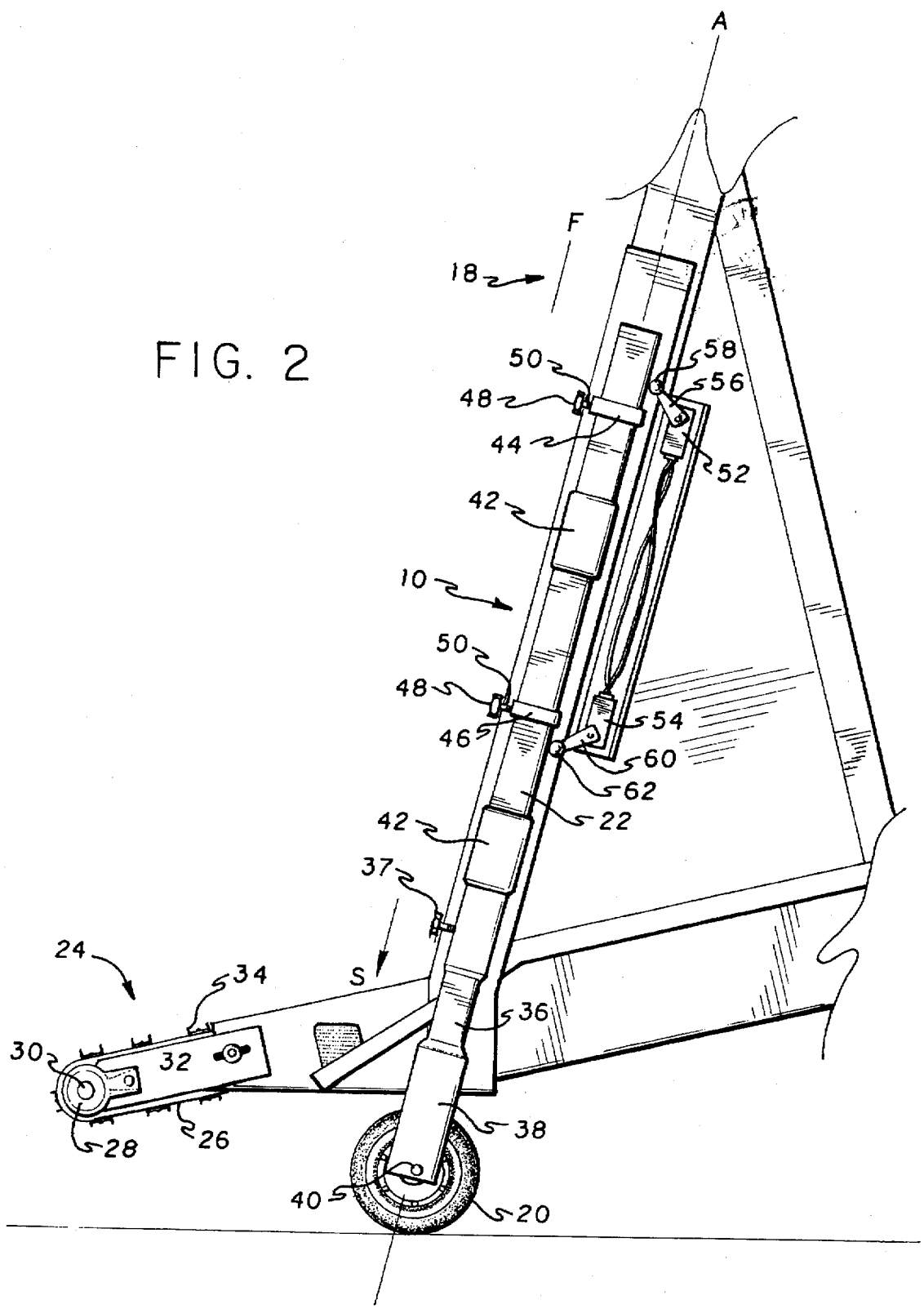
FIG. 2 is side elevational, environmental view of the present invention, showing the invention mounted on a cotton module truck and illustrating the tail section of the tilt bed of the cotton module truck.
Figure 3:
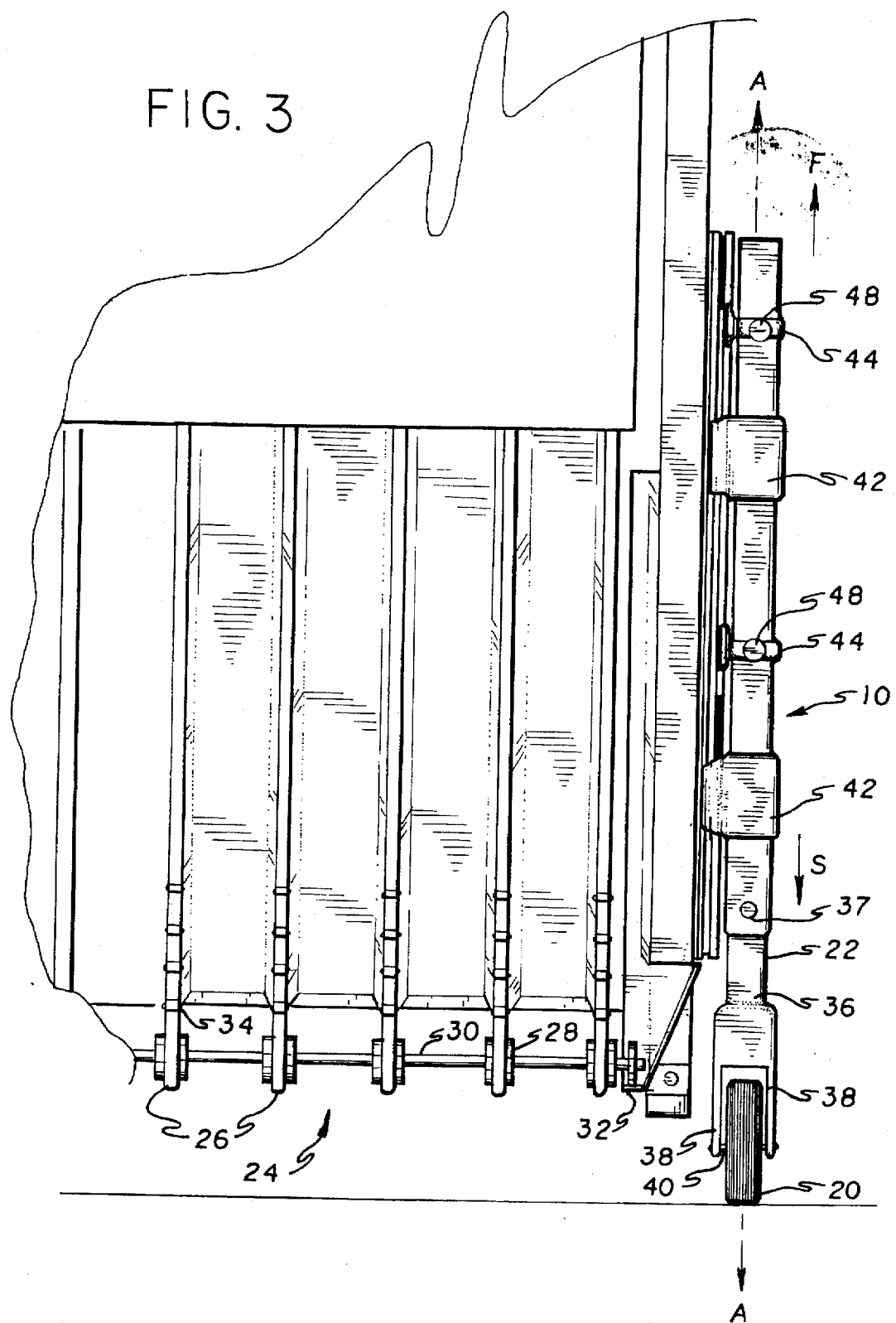
FIG. 3 is a front, environmental view of the present invention, showing the invention mounted on a cotton module truck and illustrating the tail section of the tilt bed of the cotton module truck.

Referring to FIGS. 2 and 3, tail section 18 of tilt bed 14 includes a rotating chain assembly 24 for lifting cotton modules into the tilt bed 14. Rotating chain assembly 24 is constructed of a plurality of parallel chains 26 each of which rotate about a corresponding rear sprocket 28. The rear sprockets 28 are maintained by a support bar 30 which in turn is supported by a frame 32. Frame 32 is fixed to the tail section 18 of tilt bed 14. Each one of the plurality of parallel chains 26 extends from a rear sprocket 28 around an opposing front sprocket (not shown) positioned within the tilt bed 14 and continues back to the rear sprocket 28, thus forming a continuous rotating belt of chains. Each chain 26 includes a gripping member 34 formed on the exterior surface of the chain 26. In operation, the tail section 18 of cotton module truck 12 is positioned adjacent a cotton module such that the gripping members 34 of each of the chains 26 engage the cotton module and lift the cotton module onto the chain assembly 24 to transport the cotton module into the tilt bed 14 of the truck 12.

The terrain following member 20 follows the terrain profile as the cotton module truck 12 traverses the terrain. The support member 22 movably attaches the terrain following member 20 to the tilt bed 14 proximate the tail section 18. Support member 22 is in the form of an elongated column having a first end 36 and a longitudinal axis, indicated by line A. First end 36 fits within support member 22 and is adjustable relative to the support member 22 along the longitudinal axis of the support member. An adjustment bolt 37 releasably secures front end 36 to the support member 22. Two parallel extensions 38 project from the first end 36 of the support member 22. Each of the two parallel extensions 38 include an aperture. The apertures are positioned in registry with one another, permitting a pin 40 to extend therethrough to support the terrain following member 20. In the present embodiment, the terrain following member is in the form of a wheel. Alternatively, the terrain following member 20 may be in the form of a ski or sled.

The support member 22 is movably attached to the tilt bed 14 by two fixed collars 42. The fixed collars 42 permit translational movement of the support member 22 relative to the fixed collars 42 along an axis coincident with the longitudinal axis of the support member 22. The support member 22 moves in response to changes in the terrain profile and is capable of assuming a range of positions including a first position and a second position.

A first adjustable collar 44 and a second adjustable collar 46 are positioned on the support member 22. The first adjustable collar 44 and the second adjustable collar 46 each include a handle 48 having a threaded post 50 for matingly engaging a hole in the respective first adjustable collar 44 and second adjustable collar 46. The threaded post 50 is capable of selectively engaging and disengaging the support member 22 in order to secure or release, respectively, the adjustable collars, 42 and 44, to the support member 22.

A first electrical contact 52 and a second electrical contact 54 are fixed to the tilt bed 14 adjacent the support member 22. In the present invention, the first electrical contact 52 and the second electrical contact 54 are in the form of limit switches. Alternatively, the electrical contacts 52 and 54 can be in the form of any well known means of transducing the motion of the support member 22 into an electrical signal. The first electrical contact 52 includes a first pivot arm 56 having attached thereto a first roller 58. The first pivot arm 56 pivots between an open position, opening the first electrical contact 52, and a closed position, closing the first electrical contact 52. The first roller 58 travels along surface of the support member 22, as the support member 22 moves between the range of positions, maintaining the pivot arm 56 in the open position.

The second electrical contact 54 includes a second pivot arm 60 having attached thereto a second roller 62. The second pivot arm 60 pivots between an open position, opening the second electrical contact 54, and a closed position, closing the second electrical contact 54. The second roller 62 travels along the surface of the support member 22, as the support member 22 moves between the range of positions, maintaining the pivot arm 56 in the open position.

When the support member 22 moves to the first position, first roller 58 engages the first adjustable collar 44 pivoting the first pivot arm 56 to the closed position. When the support member 22 moves to the second position, second roller 62 engages the second adjustable collar 46 pivoting the second pivot arm 60 to the closed position.

Figure 4:
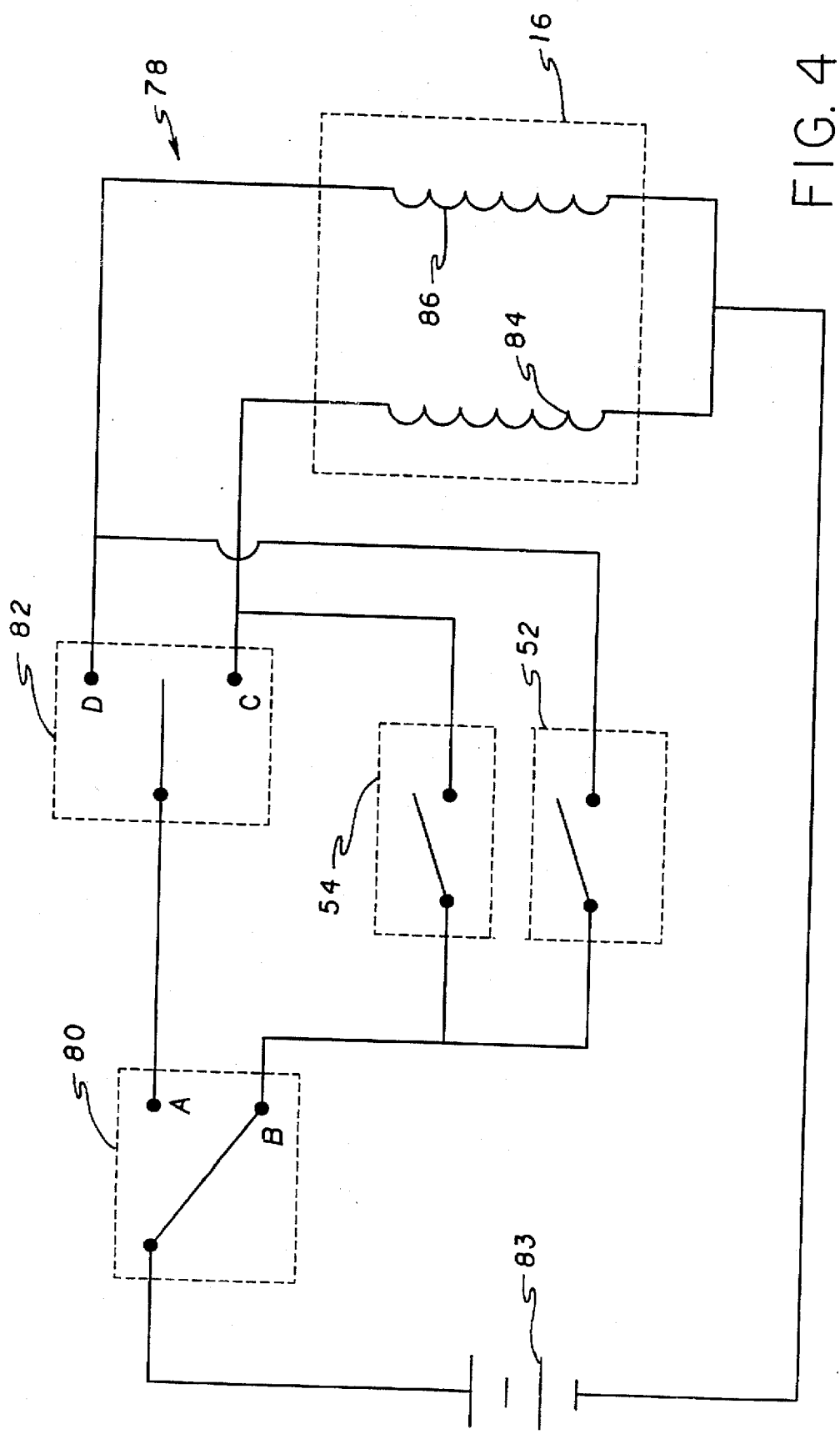
FIG. 4 is an electrical circuit diagram for the invention as shown in FIGS. 1-3.

FIG. 4 illustrates an electrical control circuit 78 for the height adjustment system 10 which includes a first control switch 80, a second control switch 82, a power source 83, the first electrical contact 52 and the second electrical contact 54, and the lift mechanism 16. In the present embodiment, lift mechanism 16 includes an up solenoid valve 84 and a down solenoid valve 86 for controlling a pneumatic lift mechanism. Activation of the up solenoid valve 84 raises the front end 19 of the tilt bed 14, thus lowering the tail section 18. Activation of the down solenoid valve 86 lowers the front end 19 of the tilt bed 14, thus raising the tail section 18.

The first control switch 80 permits a driver of the cotton module truck 12 to activate the height adjustment system 10, allowing for the automatic adjustment of the height of tail section 18 by the height adjustment system 10, or to deactivate the height adjustment system 10, allowing for the manual adjustment of the height of the tail section 18 by the driver. When height adjustment system 10 is deactivated, the second control switch 82 allows the driver to manually adjust the height of the tail section 18. Preferably, first control switch 80 and second control switch 82 are located in the cab of the cotton module truck 12, such that the driver of the cotton module truck 12 can control the height of the tail section 18 without leaving the cab.

First control switch 80 includes a first pole A and a second pole B and is selectably movable between two positions—a manual position and an automatic position. In the manual position, the throw of first control switch 80 contacts the first pole A. In the automatic position, the throw of first control switch 80 contacts the second pole B.

In the manual position, current flows from the first control switch 80 to the second control circuit 82. Second control switch 82 includes a third pole C and a fourth pole D and is selectably movable between three positions—an off position, an up position, and a down position. In the off position, the throw of the second control switch 82 does not contact either pole D or C. In the up position, the throw contacts pole C allowing current to flow to the up solenoid valve 84, thus energizing up solenoid valve 84 and lowering tail section 18. In the down position, the throw contacts pole D, allowing current to flow to the down solenoid valve 86, thus energizing down solenoid valve 86 and raising tail section 18.

In the automatic position, current flows from the first control switch 80 to the first electrical contact 52 and the second electrical contact 54. Closing the first electrical contact 52 energizes the down solenoid valve 86, thus raising the tail section 18. Closing the second electrical contact 54 energizes the up solenoid valve 84, thus lowering the tail section 18.

In operation, the driver of the cotton module truck 12 places first control switch 80 in the automatic position. As the cotton module truck is positioned by the driver such that the rotating chain assembly 24 can lift a cotton module into the tilt bed 14 as described above, terrain following member 20 causes support member 22 to move through a range of positions relative to the fixed collars 42 in response to changes in the terrain profile. A rise in the terrain profile causes support member 22 to move in a first direction, indicated by arrow F on FIG. 2. A depression in the terrain profile causes support member 22 to move in a second direction, indicated by arrow S on FIG. 2.

If, when moving in the first direction in response to a rise in the terrain profile, support member 22 moves into the first position, first roller 58 will engage the first adjustable collar 44, pivoting the first pivot arm 56 to the closed position and closing the first electrical contact 52. Closing the first electrical contact 52 energizes the down solenoid valve 86, raising the tail section 18. First electrical contact 52 will remain closed, and the tail section 18 will continued to be raised, until support member 22 moves to a position intermediate the first position and the second position.

If, when moving in the second direction in response to a depression in the terrain profile, support member 22 moves into the second position, second roller 62 will engage the second adjustable collar 46, pivoting the second pivot arm 60 to the closed position and closing second electrical contact 54. Closing the second electrical contact 54 energizes the up solenoid valve 84, lowering the tail section 18. Second electrical contact 54 will remain closed, and the tail section 18 will continue to be lowered, until support member 22 moves to a position intermediate the first position and the second position.

It should be noted that the first position and the second position of the support member 22 may be varied by adjusting the first adjustable collar 44 and the second adjustable collar 46, respectively.

It is to be understood that the present invention is not limited to the sole embodiment described above, but encompasses any and all embodiments within the scope of the following claims.

We claim:

1. A height adjustment system for use with a truck having a bed, the bed having a tail, the tail of the bed being adjustable in height relative to ground level by a lifting means, said height adjustment system comprising:
   a terrain following member, the ground level defining a terrain having a terrain profile, said terrain following member following the terrain profile as the truck traverses the terrain;
   a support member movably attaching said terrain following member to the bed of the truck proximate the tail, said support member moving relative to the bed of the truck responsive to the terrain profile, said support member configured to assume a range of positions including a first position and a second position, said support member closing a first electrical contact when in said first position and closing a second electrical contact when in said second position, the lifting means being electrically connected to said first electrical contact and said second electrical contact, closing one of said first electrical contact and said second electrical contact operating the lifting means to adjust the height of the tail thereby causing said support member to assume a position intermediate said first position and said second position.

2. The height adjustment system according to claim 1, wherein said terrain following member is a wheel.

3. The height adjustment system according to claim 1, wherein said first electrical contact is a first limit switch and said second electrical contact is a second limit switch.

4. The height adjustment system according to claim 1, wherein said support member is a support column having a first end, an exterior surface, and a longitudinal axis, said terrain following member being movably attached to said support column proximate said first end.

5. The height adjustment system according to claim 4, wherein said support column is movably attached to the bed of the truck by a pair of fixed collars, said pair of fixed collars permitting translational movement of said support column relative to said pair of fixed collars along an axis coincident with said longitudinal axis of said support column.

6. The height adjustment system according to claim 4, further including a first adjustable collar and a second adjustable collar movably attached to said support column, said first adjustable collar closing said first electrical contact when said support column is in said first position, said second adjustable collar closing said second electrical contact when said support column is in said second position.

7. The height adjustment system according to claim 6, wherein said first electrical contact is a first limit switch and said second electrical contact is a second limit switch.

8. The height adjustment system according to claim 7, wherein said first limit switch includes a first pivot arm having attached thereto a first roller, said first pivot arm pivoting between a open position, opening said first limit switch, and a closed position, closing said first limit switch, said first pivot arm being maintained in said open position when said first roller is in contact with said exterior surface of said support column and said first pivot arm being urged into said closed position by said first roller when said first roller contacts said first collar; and said second limit switch includes a second pivot arm having attached thereto a second roller, said second pivot arm pivoting between a open position, opening said second limit switch, and a closed position, closing said second limit switch, said second pivot arm being maintained in said open position when said second roller is in contact with said exterior surface of said support column and said second pivot arm being urged into said closed position by said second roller when said second roller contacts said second collar.

9. A height adjustment system for use with a truck having a bed, the bed having a tail, the tail of the bed being adjustable in height relative to ground level by a lifting means, said height adjustment system comprising:

a terrain following member, the ground level defining a terrain having a terrain profile, said terrain following member following the terrain profile as the truck traverses the terrain;

a support column movably attaching said terrain following member to the bed of the truck proximate the tail, said support column having a first end, an exterior surface, and a longitudinal axis, said support column moving relative to the bed of the truck responsive to the terrain profile, said support column configured to assume a range of positions including a first position and a second position, said support column closing a first limit switch when in said first position and closing a second limit switch when in said second position, the lifting means being electrically connected to said first limit switch and said second limit switch, closing one of said first limit switch and said second limit switch operating the lifting means to adjust the height of the tail thereby causing said support column to assume a position intermediate said first position and said second position.

10. The height adjustment system according to claim 9, wherein said terrain following member is a wheel.

11. The height adjustment system according to claim 10, wherein said support column is movably attached to the bed of the truck by a pair of fixed collars, said pair of fixed collars permitting translational movement of said support column relative to said pair of fixed collars along an axis coincident with said longitudinal axis of said support column.

12. The height adjustment system according to claim 11, further including a first adjustable collar and a second adjustable collar movably attached to said support column, said first adjustable collar closing said first limit switch when said support column is in said first position, said second adjustable collar closing said second limit switch when said support column is in said second position.

13. The height adjustment system according to claim 12, wherein said first limit switch includes a first pivot arm having attached thereto a first roller, said first pivot arm pivoting between a open position, opening said first limit switch, and a closed position, closing said first limit switch, said first pivot arm being maintained in said open position when said first roller is in contact with said exterior surface of said support column and said first pivot arm being urged into said closed position by said first roller when said first roller contacts said first collar; and said second limit switch includes a second pivot arm having attached thereto a second roller, said second pivot arm pivoting between a open position, opening said second limit switch, and a closed position, closing said second limit switch, said second pivot arm being maintained in said open position when said second roller is in contact with said exterior surface of said support column and said second pivot arm being urged into said closed position by said second roller when said second roller contacts said second collar.

\* \* \* \* \*